United States Patent [19]

Brown

[11] Patent Number: 4,969,812
[45] Date of Patent: Nov. 13, 1990

[54] FLUID PRESSURE OPERATED APPARATUS FOR MOUNTING A DIFFERENTIAL PRESSURE MOLD ON A PLATEN

[76] Inventor: Gaylord W. Brown, Emerald Pointe, B-206, 25188 Marion Ave., Punta Gorda, Fla. 33950

[21] Appl. No.: 358,438

[22] Filed: May 30, 1989

[51] Int. Cl.$^5$ .............................................. B29C 51/38
[52] U.S. Cl. .................................... 425/398; 100/270; 425/412; 425/450.1; 425/451.2
[58] Field of Search ............... 425/450.1, 451.2, 451.9, 425/589, 590, 595, 395, 408, 389, 390, 394, 406, 412, 398, DIG. 48, 416; 100/219, 269 R, 270; 264/297.5, 325

[56] References Cited

U.S. PATENT DOCUMENTS

| | | | |
|---|---|---|---|
| 3,346,923 | 10/1967 | Brown et al. | 425/155 |
| 3,868,209 | 2/1975 | Howell | 425/157 |
| 3,969,057 | 7/1976 | Pierre | 425/590 |
| 4,245,971 | 1/1981 | MacMillan | 425/595 |

FOREIGN PATENT DOCUMENTS

| | | | |
|---|---|---|---|
| 221872 | 5/1987 | European Pat. Off. | 425/450.1 |
| 58-38118 | 3/1983 | Japan | 425/589 |

*Primary Examiner*—Jay H. Woo
*Assistant Examiner*—James P. Mackey
*Attorney, Agent, or Firm*—B. W. Norton

[57] ABSTRACT

A differential pressure machine for differentially pressure forming an article in a sheet of thermoplastic material including a frame, upper and lower platens movable on the frame between spread and less spread positions. Mechanism is provided for moving the platens between the spread and less spread positions for releasably locking the platens in the less spread positions. Upper and lower, opposed differential pressure molds mounted on the upper and lower platens, respectively, for movement therewith between open positions and closed positions for engaging opposite sides of a thermoplastic sheet of material and differentially pressure forming an article therein. Fluid pressure operated mechanism mounts one of the upper and lower molds on one of the upper and lower platens for movement therewith and for movement relative thereto when the platens are locked in the less spread positions to incrementally move one of the molds relative to one of the platens toward the other of the molds to tightly sandwich the sheet between the upper and lower molds including a variable volume, fluid pressure chamber between confronting portions of one of the platens and one of the molds. The invention is characterized in this that a separator plate is disposed in the chamber between the confronting portions of one platen and one mold and opposed annular seals are disposed between, and in sealing engagement with, the separator plate and the one platen and the one mold.

8 Claims, 2 Drawing Sheets

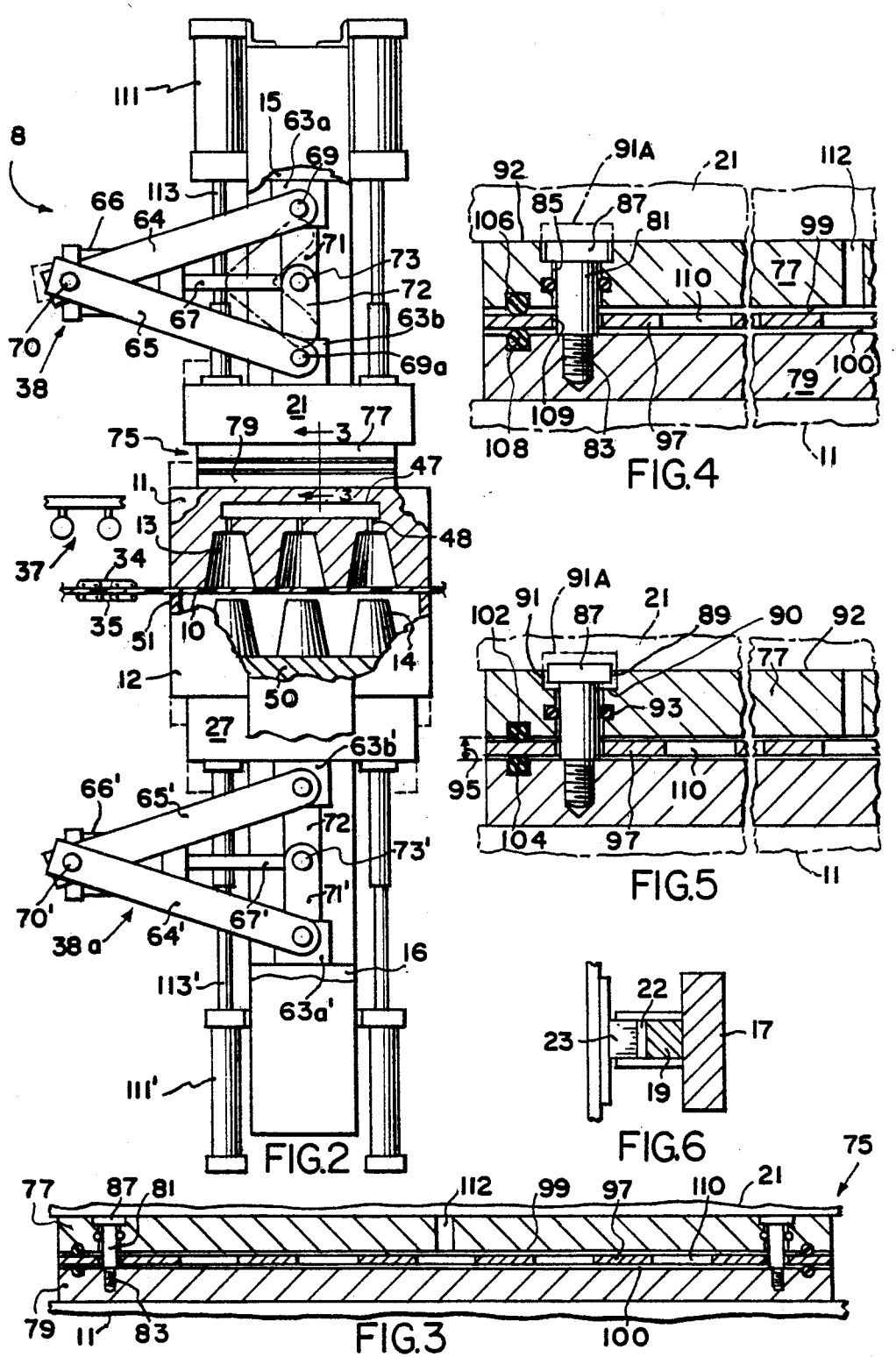

FLUID PRESSURE OPERATED APPARATUS FOR MOUNTING A DIFFERENTIAL PRESSURE MOLD ON A PLATEN

BACKGROUND OF THE INVENTION

1. FIELD OF THE INVENTION

This invention relates to a differential pressure forming machine and more particularly to fluid pressure operated apparatus for mounting a differential pressure mold for movement with, and relative to, a vertically movable, mold mounting platen.

2. DESCRIPTION OF THE PRIOR ART

Differential pressure forming machines, are disclosed in U.S. Pat. No. 3,346,923, issued to G. W. Brown et al on Oct. 17, 1967, and U.S. Pat. No. 3,496,257, issued to G. W. Brown et al on Feb. 17, 1970, which are fully incorporated herein by reference as though fully recited word-for-word herein. These differential pressure forming machines include a pair of differential pressure molds which are vertically moved between spaced apart positions and closed, adjacent positions abutting opposite sides of a thermoplastic sheet of material at a forming station to differentially pressure form an object therein. In U.S. Pat. No. 3,868,209 issued to George H. Howell on Feb. 25, 1975, which is incorporated herein by reference, a thermoforming machine of the type described is disclosed wherein the upper and lower platens are locked in a closed position and thereafter expandable air bladders are provided on the lower platen to raise the lower mold relative to the lower platen toward the upper mold to tightly squeeze a thermoplastic sheet therebetween.

It is also known to mount a mold on a platen via a plate which is separated from the platen by a small gap in which a circumferentially disposed seal is disposed in sealing engagement with the mold mounting plate and the platen. The seal is compressible but the range of relative movement between the mold and platen is restricted. Accordingly, it is an object of the present invention to provide a new and novel apparatus for mounting a differential pressure mold on a platen.

It is another object of the present invention to provide new and novel fluid pressure operated apparatus for mounting a differential pressure mold on a platen.

A further object of the present invention is to provide new and novel apparatus of the type described for mounting a mold on a platen with double the stroke capacity.

A further object of the present invention is to provide fluid pressure operated apparatus for mounting a differential pressure mold on a platen by means of an expansible and contractible, fluid pressure operated chamber comprising an intermediate plate disposed between a plate which is mounted on the platen and a plate which mounts the mold, and disposing a seal between the intermediate plate and each of the tool mounting plate and the platen mounting plate.

Other objects and advantages of the present invention will become apparent to those of ordinary skill in the art as the description thereof proceeds.

SUMMARY OF THE INVENTION

In a machine, such as a differential pressure forming machine, for performing in operation, such as molding an article, in a sheet of thermoplastic material comprising a frame, a pair of opposed vertically spaced apart upper and lower platens, apparatus for moving the upper and lower platens between spaced apart positions and less spaced apart positions, upper and lower molds mounted on the upper and lower platens for movement therewith and for movement relative thereto to engage opposite sides of a sheet of thermoplastic material and differentially pressure form an object therein; and apparatus for mounting one of the upper and lower molds for movement relative to one of the upper and lower platens, respectively, including a separator plate disposed between the one mold and the one platen, and first and second seals disposed between the plate and portions of the one mold and the one platen to provide an expansible and contractible chamber which expands and contracts in response to fluid pressure to move the one mold, when the molds are in their less spaced apart positions, relative to the one platen and toward the other mold to squeeze the thermoplastic sheet disposed between the upper and lower molds.

BRIEF DESCRIPTION OF THE DRAWINGS

The invention may be more readily understood by referring to the accompanying drawings, in which:

FIG. 2 is an end elevational view of the machine illustrated in FIG. 1, part of the frame being broken away to more clearly illustrate the differential pressure operated linkage, and parts of the molds being broken away in section to more clearly illustrate the internal portions of the mold box assemblies;

FIG. 3 is a greatly enlarged front sectional view, taken along the line 3—3 of FIG. 2, illustrating only the fluid pressure operated apparatus for mounting the upper mold on the upper platen;

FIG. 4 is a further enlarged front sectional view, similar to FIG. 3 illustrating the upper mold in a fully expanded position in which it is in sealing engagement with a thermoplastic sheet;

FIG. 5 is a front sectional view similar to FIG. 4 but illustrating the upper mold in a retracted position in which the upper mold is not in sealing engagement with a thermoplastic sheet; and FIG. 6 is an enlarged sectional plan view, taken along the line 6—6 of FIG. 1, more particularly illustrating one of the guides and rails which movably mount the platen on the side frame rails.

DESCRIPTION OF THE PREFERRED EMBODIMENT

Figure 1:
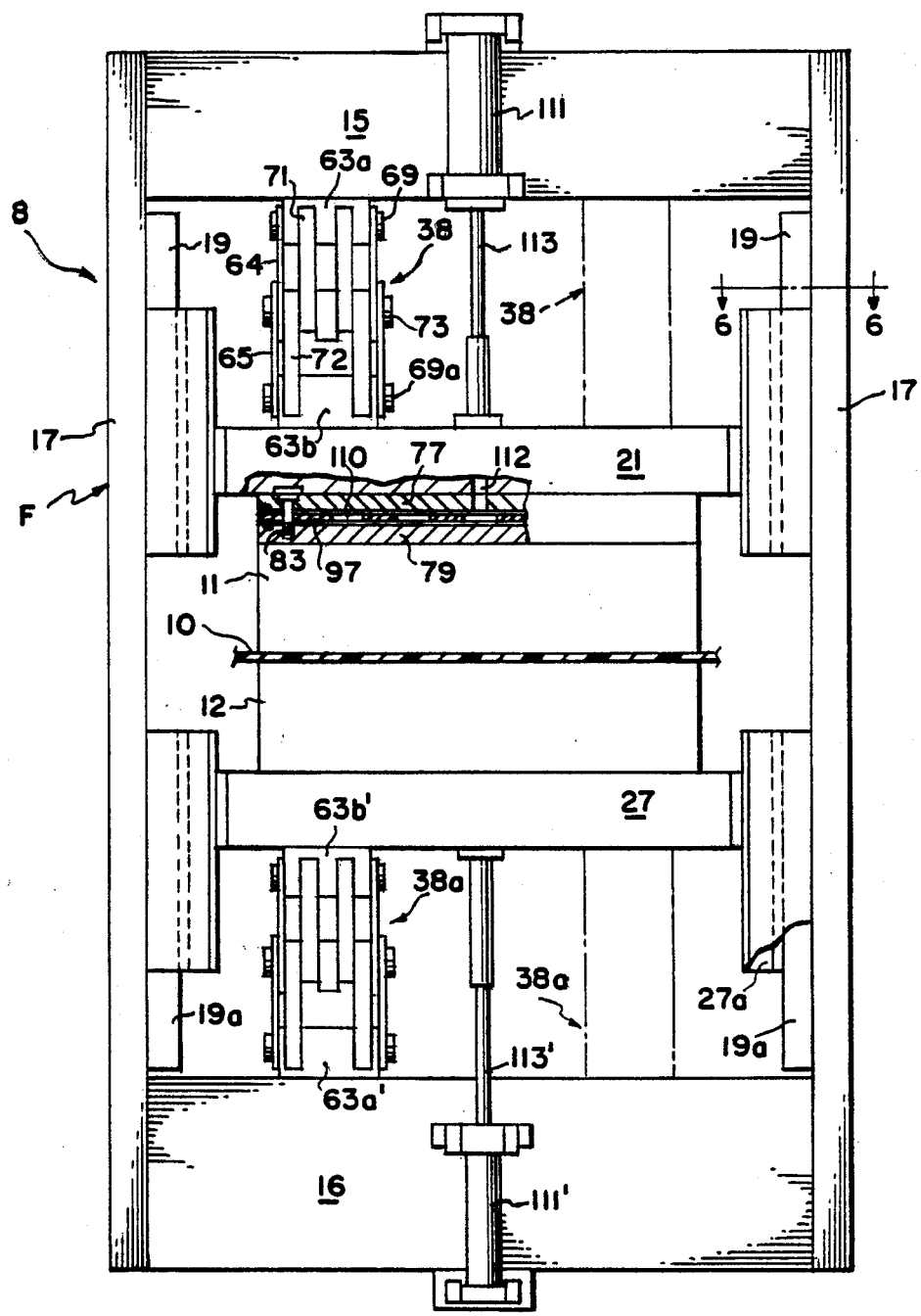
FIG. 1 is a front elevational view of a differential pressure forming machine incorporating apparatus constructed according to the present invention, parts of the apparatus being broken away in section to more clearly illustrate otherwise hidden portions thereof.

Referring now more particularly to the accompanying drawings, a differential pressure forming machine, generally designated 8, is provided for forming parts in a web or sheet 10 of suitable thermoplastic material, such as polystyrene.

This machine may be of the type disclosed in the aforementioned United States patents which are fully incorporated herein by reference.

Generally, however, the frame of the machine, generally designated F, includes upper and lower header and base members 15 and 16, respectively, which are connected at both ends by vertical side column members 17. While only the mold assembly portion of the machine is primarily depicted in the drawing, it is to be understood that the apparatus constructed according to the present invention is part of an entire forming machine such as that disclosed in the aforementioned patents which are fully incorporated herein by reference.

The machine 8 includes an upper female mold or die box assembly 11 and lower male mold or die box assembly, generally designated 12. The female mold assembly 11 includes spaced apart cavities 13 for forming thin walled parts such as drinking cups, in the plastic web 10. The male mold assembly 12 includes complementally shaped plug assist members 14 in vertical alignment with the cavities 13.

Vertical rails 19 are mounted on the inner walls of the columns 17 to furnish guide surfaces for a vertically traveling, upper platen 21 which carries the female mold assembly 11 in a manner as will be described more particularly hereinafter. It will be seen that transversely extending, vertically disposed slides 23, having thrust plates 22, guide on the inner surfaces of the vertical guide rails 19, as illustrated, during vertical travel of the platen 21.

A pair of fluid pressure operated apparatus, generally designated 38, is provided for lowering the upper platen 21 and mold box 11 to a lowered, closed forming position toward the plastic web 10. A lower platen 27, mounting male die box assembly 12, is also mounted for vertical travel on a pair of guide rails 19a, there being vertical slides 27a on the lower platen 27 which are received on lower guide rails 19a.

A pair of fluid pressure operated linkage apparatus, generally designated 38a, is provided for moving the lower platen 27 and mold 12 between a lowered position and a raised, closed forming position in engagement with the underside of the plastic web 10. Only one of each of the upper linkage apparatus 38 and 38a is illustrated in detail, it being understood that the other linkage apparatus is identical thereto. As described in the aforementioned patents, the fluid pressure operated apparatus 38 and 38a are concurrently operated to concurrently move the upper and lower molds 11 and 12 in opposite directions to alternate, open and closed, sheet engaging positions.

The plastic web 10 is fed intermittently between the upper and lower molds 11 and 12 in the usual manner by pairs of superposed, nesting, upper and lower endless chains 34 and 35 which are described more particularly in U.S. Pat. No. 3,217,852 also incorporated herein by reference, U.S. Pat. No. 3,677,675 and Pat. No. 3,346,923. A heater, schematically designated 37 and more particularly described in U.S. Pat. No. 3,346,923 and Pat. No. 3,677,675 is provided for bringing the plastic web 10 to a forming temperature.

The upper die unit 11 may suitably include a vacuum manifold chamber 47 which connects the cavities 13 by means of passages 48. The male die box assembly 12 includes a member 50 mounting a plug assist male mold member 14 in spaced relation with a surrounding clamp frame 51.

The upper and lower fluid pressure operated toggle mechanisms, generally designated 38 and 38a, respectively, move the upper and lower platens 21 and 27, respectively, and mold members 11 and 12, respectively, between the vertically spaced apart open positions, illustrated in chain lines in FIG. 2, and the closed forming positions illustrated in solid lines in FIG. 2, to maintain the molds 11 and 12 in tightly sealed relation with the plastic web 10 during the forming operation.

The toggle mechanisms 38 and 38a are more particularly described in the aforementioned patents, however, each toggle mechanism 38 includes pairs of vertically spaced apart block 63a and 63b and it will be seen that pairs of links 64 and 65 at one side of the platen 21 connect the upper and lower block 63a and 63b, respectively, with the outer end of horizontally disposed fluid pressure operated cylinder 66 which has a piston rod 67. The blocks 63a are fixed to the header 15.

The relatively expandable and contractible links 64 and 65 are pivotally connected to the upper and lower blocks 63a and 63b, at each end of the platens 21, as with pins 69 and 69a, and are pivotally connected to the end of the cylinder 66 by a pin 70. The front end of each piston rod 67 is pivotally connected to the upper and lower block 63a and 63b by pairs of links 71 and 72. The links 71 and 72 are connected to the box 63a and 63b by the pins 69 and 69a and to the piston rod 67 in each case by a pin 73.

It will be noted that the cylinder 66' and associated linkages are utilized at the side of the lower platen member 27, as well, except that the toggle mechanisms are inverted so that the blocks 63b' are uppermost. Accordingly, it will not be necessary to described the toggle mechanisms for the lower platen 27 in detail. The identical parts are given the same reference characters except that primed numerals have been employed. The piston rods 67' of the cylinders 66' are actuated at the same time and function both to aid in raising the platen 27 and to preload the lower platen 27 in a direction toward the plastic web 10 and lock it in position.

When fluid is admitted to one end of each of the cylinders 66 and 66', each of the piston rods 67 and 67' will retract to move toward the left in FIG. 2 and raise the upper platen 21 and concurrently lower the lower platen 27. When fluid is supplied to the opposite ends of the cylinders 66 and 66', the piston rods 67 and 67' will expand the links 64–65 and 64–65' from the generally coextensive positions, illustrated in chain lines in FIG. 2, to the generally vertically aligned positions or "over center" positions, illustrated in solid lines in FIG. 2, to lock the molds 11 and 12 in the positions illustrated in solid lines in FIG. 2. The extended positions of the linkage assemblies 38 and 38a is indicated in solid lines in FIG. 2 wherein the links 71 and 72 have reached the dead center positions.

Apparatus, generally designated 75, is provided for mounting the upper mold 11 on the upper platen 21 for movement therewith and for movement relative thereto when the molds 11 and 12 are in the closed positions, illustrated in solid lines in FIG. 2. Apparatus 75 includes a platen plate 77 fixed to the underside of the platen 21 and a tool plate 79 fixed to the upper side of the mold 11. The platen plate 77 is coupled to the tool plate 79 via a plurality of shoulder bolts, generally designated 81, which are threadedly coupled at 83 to the tool plate 79 and are freely received in vertical passages 85 provided in the platen plate 77.

The bolts 81 include enlarged diameter heads 87 received in counter sunk holes 91 provided in the upper surface 92 of the platen plate 77. The heads 87 include circumferential shoulders 89 which bear against the end surfaces 90 of the counter sunk holes 91 provided in the upper surfaces 92 of the platen plates 77. The bolts 81 vertically support the tool platen 79 and upper mold 11 on the upper platen 21 and limit the downward travel of upper mold 11 relative to upper platen 21. An annular seal or O-ring 93 is disposed in sealing engagement with the shaft of each bolt 81 as well as the upper platen plate 77 to keep the bolts 81 in sealing engagement with the upper platen 77 as the bolts 81 and upper platen plate 77 relatively move as will be described more particularly hereinafter. Recesses 91A are provided in the platen 21 to receive the bolt heads 87 when they are moved upwardly to the positions illustrated in FIG. 5.

The platen plate 77 and tool mounting plate 79 are separated by a vertical gap 95 which is typically 0.200 inches in length. Disposed in the gap 95 is a separator plate 97 which is equally spaced from the platen plate 77 and tool plate 79 via reduced gap 99 and 100, respectively. A pair of upper and lower, annular, circumferentially extending resilient seals or O-rings 102 and 104 are received in the gaps 99 and 100 respectively, as well as annular grooves 106 and 108, provided in platen plate 77 and tool mounting plate 79 respectively. The resilient seals 102 and 104, which are sandwiched between the platen plate 77 and tool mounting plate 79, seal the separator plate 97 to the platen plate 77 and to the tool mounting plate 79.

The separator plate 97 includes apertures 109 for receiving the bolts 81 as well as perforated holes 110 which allows pressurized air to pass therethrough to equalize the pressure in the gaps 99 and 100. Pressurized air is provided to the gaps 99 and 100 through the plate 77 via an aperture 112 coupled to a source of pressurized air. The bolts 81 allow the mold mounting plate 79 and mold 11 to vertically move relative to the platen 21 and platen plates 77 between the now sealing spread position, illustrated in solid lines in FIG. 5, and the less spread, sealing positions, illustrated in FIG. 4 when the molds 11 and 12 are in the closed positions illustrated in solid lines in FIG. 2. As is best illustrated in FIGS. 4 and 5, the cross-sectional diameter of each O-ring 102 and 104 is less than the combined thickness of the gaps 99 and 100.

A pair of fluid pressure operated balancing cylinders 111 is mounted on the header 15 and include piston rods 113 coupled to the plate 21 for balancing the weight of the mold and control the rate of movement thereof. Similar balancing cylinders are provided between the lower platen and base 16 and are identified by similar reference characters followed by a prime designation.

While only one separator plate 97 and one set of seals 102, 104 are illustrated, it should be understood that the gap thickness 95 could be increased and a plurality of sets of stacked separator plates 97 and seals 102, 104 utilized.

THE OPERATION

A sheet of thermoplastic material 10 is disposed between the molds 11 and 12 in the spaced apart positions, illustrated in chain lines in FIG. 2.

The upper and lower pairs of cylinders 66 and 66' are actuated to move the molds 11 and 12 to the closed positions, illustrated in lines in FIG. 2, in which the links 71 and 72 have reached the dead center positions illustrated in solid lines in FIG. 2.

When the mold boxes 11 and 12 move to the closed positions, it will force the tool plate 79 and mold 11 upwardly relative to the now locked, upper platen 21, to the position illustrated in FIG. 5. At this stage, the seals 102, 104 will be slightly compressed as illustrated in FIG. 5.

Fluid, such as air, is then admitted to the gaps 99 and 100 via the supply opening 112 to urge the tool mounting plate 79 and mold 11 downwardly away from the platen mounting plate 77 and platen 12 to the position illustrated in FIG. 4. The upper mold 11 is thus forced downwardly, relative to the platen 21, toward the now stationarily locked lower mold 12, to tightly squeeze and pinch the sheet 10 and insure sealing engagement between the molds 11 and 12 and the sheet 10.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Apparatus for differential pressure forming thermoplastic objects from at least one thermoplastic sheet comprising:
   a frame;
   means for supporting a thermoplastic sheet on said frame at a forming station;
   a pair of opposed, cooperating mold means for engaging opposite sides of said sheet to differentially pressure form an object in said sheet;
   means for relatively moving said mold means between spaced apart, open positions removed from said sheet and closed positions engaging opposite sides of said sheet;
   one of said mold means including
      a platen;
      a mold member;
   means mounting said mold member in spaced relation with said platen for movement therewith and for movement relative thereto between a non-sealing position and a sheet sealing position comprising:
      a gap defined by opposing portions of said mold member and said platen;
      at least one separator plate disposed in said gap between said opposing portions of said mold member and said platen;
      a first endless yieldable seal means sandwiched between said opposing portions of said mold member and one side of said separator plate, to define an air pressure cavity on one side of said separator plate;
      a second endless yieldable seal means sandwiched between said opposing portion of said platen and the opposite side of said separator plate to define a second air pressure cavity on said opposite side of said separator plate; and
   fluid actuated means for incrementally moving said mold member relative to said platen from said non-sealing position toward said sheet to said sealing position to tightly sandwich said sheet between said pair of mold means and insure sealing engagement between said pair of mold means and opposite sides of said sheet comprising:
   means for admitting fluid under pressure to each of said cavities to move said mold member relative to said platen from said non-sealing position to said sealing position.

2. The apparatus set forth in claim 1 wherein said separator plate is perforated.

3. The apparatus set forth in claim 1 wherein each of said seal means comprises an O-ring.

4. The apparatus set forth in claim 3 wherein said opposing portions of said mold member and said platen each include an annular slot receiving one of said O-rings.

5. The apparatus set forth in claim 4 wherein the diameter of each O-ring is less than the combined thickness of said air pressure cavities on opposite sides of said separator plate.

6. Apparatus for differential pressure forming a thermoplastic object from a thermoplastic sheet comprising:
a frame;
means for supporting a thermoplastic sheet on said frame at a forming station;
a pair of opposed cooperating mold means for engaging opposite sides of said sheet at said forming station to differentially pressure form an object in said sheet;
means for relatively moving one of said mold means toward and away from the other of said mold means between spaced apart, open positions and closed positions engaging opposite sides of said sheet including
a pair of opposed platen means for mounting said pair of opposed mold means;
means for moving said platen means on said frame, toward and away from each other, to move said mold means between said spaced apart, open positions and said closed positions;
means mounting at least one of said mold means on one of said platen means for movement therewith, but in spaced relation for movement relative thereto, when said mold means are in said closed positions, between a sealing, spread position spread from said one platen means and a non-sealing less spread position;
means between said one mold means and said one platen means defining a variable volume fluid chamber comprising
a separator plate between said one mold means and said one platen means;
a pair of annularly extending resilient means sandwiched between opposite sides of said separator plate and said one mold means and said one platen means; and
means for admitting fluid under pressure to said chamber to move said one mold means away from said one platen means from said non-sealing position to said sealing position to tightly sandwich said sheet between said pair of mold means.

7. Apparatus for differential pressure forming a thermoplastic object from a thermoplastic sheet comprising:
a frame;
means for supporting a sheet of thermoplastic material at a forming station;
a pair of opposing, differential pressure mold means for engaging opposite sides of said sheet at said forming station to differentially pressure form said object;
means for relatively moving said mold means between spaced apart positions and closed sheet engaging positions comprising
upper and lower mold mounting platens movable on said frame toward and away from each other
means mounting one of said mold means on one of said platens for movement therewith but in spaced relation relative thereto to allow said one mold means to move relative to said one platen when said mold means are in said sheet engaging positions between sealing spread positions in which said one mold means is spread from said one platen means and in sealing engagement with said sheet and less spread non-sealing positions;
means for moving said one mold member from said less spread position to said spread position when said mold means are in said sheet engaging positions including a separator plate disposed between said one mold means and said one platen, a pair of yieldable means disposed between opposite sides of said plate and each of said one platen and said one mold means respectively to define an expansible and contractible fluid pressure chamber between said one mold means and said one platen; and
means for admitting fluid under pressure to said chamber to expand said chamber when said pair of mold means are in said closed sheet engaging positions to move said one mold means away from said one platen to said sealing position to tightly sandwich said sheet between said pair of mold means and insure said mold means are sealed to opposite sides of said sheet.

8. A differential pressure machine for differentially pressure forming an article in a sheet of thermoplastic material including
a frame;
upper and lower platens movable on said frame between spread and less spread positions;
means for moving said platens between said spread and less spread positions and for releasably locking said platens in said less spread positions;
upper and lower, opposed, differential pressure mold means mounted on said upper and lower platens, respectively, for movement therewith between open positions and closed positions for engaging opposite sides of a thermoplastic sheet of material and differentially pressure forming an article therein;
fluid pressure operated means mounting one of said upper and lower mold means on one of said upper and lower platens, respectively, for movement relative thereto when said platens are locked in said less spread positions to incrementally move said one mold means relative to said one platen toward the other of said upper and lower mold means to tightly sandwich said sheet between said upper and lower mold means;
said fluid pressure operated means comprising a variable volume fluid pressure chamber between confronting portions of said one platen and said one mold means
wherein
a separator plate is disposed in said chamber between said confronting portions of said one platen and said one mold means, and first and second circumferentially extending seal means are disposed between, and in sealing engagement with said separator plate and each of said one platen and said one mold means respectively.

* * * * *